US008384443B2

(12) United States Patent
Chamakura

(10) Patent No.: US 8,384,443 B2
(45) Date of Patent: Feb. 26, 2013

(54) CURRENT MIRROR AND CURRENT CANCELLATION CIRCUIT

(75) Inventor: Anand Chamakura, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 97 days.

(21) Appl. No.: 13/015,273

(22) Filed: Jan. 27, 2011

(65) Prior Publication Data

US 2012/0194264 A1 Aug. 2, 2012

(51) Int. Cl.
*H02M 11/00* (2006.01)

(52) U.S. Cl. .................... 327/103; 327/102; 250/214 AL

(58) Field of Classification Search .......... 327/101–103; 250/214 B, 214 C, 214 LS, 214 AL
See application file for complete search history.

(56) References Cited

U.S. PATENT DOCUMENTS

| | | | | |
|---|---|---|---|---|
| 5,821,528 | A * | 10/1998 | Liao et al. | 250/214 R |
| 6,188,498 | B1 * | 2/2001 | Link et al. | 398/195 |
| 7,075,766 | B2 * | 7/2006 | Moyer et al. | 361/93.1 |
| 7,205,920 | B2 * | 4/2007 | Morrow et al. | 341/144 |
| 7,295,140 | B2 * | 11/2007 | Chuang | 341/143 |
| 7,507,947 | B2 * | 3/2009 | Bamji et al. | 250/214 A |
| 7,605,359 | B2 * | 10/2009 | Dai et al. | 250/214 R |
| 8,106,347 | B2 * | 1/2012 | Drummond et al. | 250/214 AL |
| 2007/0023614 | A1 * | 2/2007 | Park et al. | 250/214.1 |
| 2008/0312517 | A1 * | 12/2008 | Genoe et al. | 600/323 |
| 2011/0192958 | A1 * | 8/2011 | Huang et al. | 250/214 A |
| 2012/0049927 | A1 * | 3/2012 | Dyer | 327/355 |
| 2012/0146607 | A1 * | 6/2012 | Kung et al. | 323/283 |

* cited by examiner

*Primary Examiner* — Thomas J Hiltunen
(74) *Attorney, Agent, or Firm* — Advent IP, P.C., L.L.O.

(57) ABSTRACT

Techniques are described to mirror currents and subtract currents accurately. In an implementation, a circuit includes a first current source coupled to a first node to provide a current IPD1 and a current mirror coupled to the first node through a first switch T1 to provide a current IREF1. In a closed configuration, the current IREF1 flows from the current mirror into the first node. A sigma delta modulator controls the switch T1 such that over a period of time an average current flowing from the current mirror into the first node is equal to the current IPD1 flowing out of the first node. The sigma delta modulator generates a digital output to control switch T2 to allow a current IREF2 into a second node, thus subtracting a portion of a current IPD2 at the second node over a period of time.

14 Claims, 4 Drawing Sheets

CURRENT MIRROR AND CURRENT CANCELLATION CIRCUIT

BACKGROUND

Current cancellation techniques may be utilized to cancel current at one or more nodes of a circuit. For example, current cancellation techniques may be utilized to cancel leakage current that degrades signals in a current sensor device. In a specific example, current cancellation techniques may be utilized in optical sensors. Optical sensors that employ photo sensor diodes are used in electronic devices to detect ambient light conditions. However, the resolution of such optical sensors can be limited by leakage current, most notably dark current produced by the photo sensor diodes. Dark current is the current that is generated by photo sensor diodes when the photo sensor diodes are exposed to total darkness (i.e., are exposed to no light). The amount of dark current generated by photo sensor diodes varies with process variations of the diode, the area of the diode, the temperature of the diode, the junction depth of the diode, and so forth. However, the amount of dark current generated in typical optical sensors may range from one (1) pico Ampere (pA) to one hundred (100) pA at room temperature.

As illustrated in FIG. 1, current IPD1 may be mirrored to subtract, or cancel, the unwanted portion of current (e.g., dark current in current IPD2) at the second node. For instance, if transistors M1 and M2 are accurately matched, transistor M1 mirrors the exact value of current IPD1 to transistor M2, which cancels current IPD2 at the second node (e.g., current at the second node is defined by the equation [IPD2−IPD1]). However, due to the mismatching of transistors M1 and M2, current IPD1 may not be accurately mirrored to transistor M2, which does not allow for an accurate subtraction to occur at the second node.

SUMMARY

Techniques are described to mirror currents and subtract currents accurately. In one or more implementations, a circuit includes a first current source coupled to a first node to provide a first current source current IPD1 and a current mirror coupled to the first node through a first switch T1 to provide a current mirror reference current IREF1. The first switch T1 is configured to have an open configuration and a closed configuration. In the closed configuration, the current mirror reference current IREF1 flows from the current mirror into the first node. In the open configuration, no current flows from the current mirror into the first node. A sigma delta modulator is configured to control the switch configuration (e.g., open configuration, closed configuration) of the switch T1 such that over a period of time an average current flowing from the current mirror into the first node is at least approximately equal to the first current source current IPD1 flowing out of the first node. The sigma delta modulator generates a discrete pulse density modulated output to control switch T2 to allow a second current mirror reference current IREF2 into a second node, thus subtracting a portion of the second current source current IPD2 at the second node over a period of time (e.g., clock cycles). In an implementation, when the first current mirror reference current IREF1 equals the second current mirror reference current IREF2, the equivalent current at the second node is the difference of the first current source current IPD1 and the second current source current IPD2. Currents mirror reference currents IREF1 and IREF2 may be matched utilizing dynamic element matching such that IREF1 and IREF2 are interchanged every clock cycle. In an implementation, IREF2 may be a multiple of IREF1 and may be used as a current mirror to provide current at another node. The techniques are suitable for use in optical sensors to provide dark current cancellation produced by one or more current sources (e.g., photo sensor diodes of the optical sensors, etc.). However, it is contemplated the techniques described herein may be utilized in other applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Figure 1:
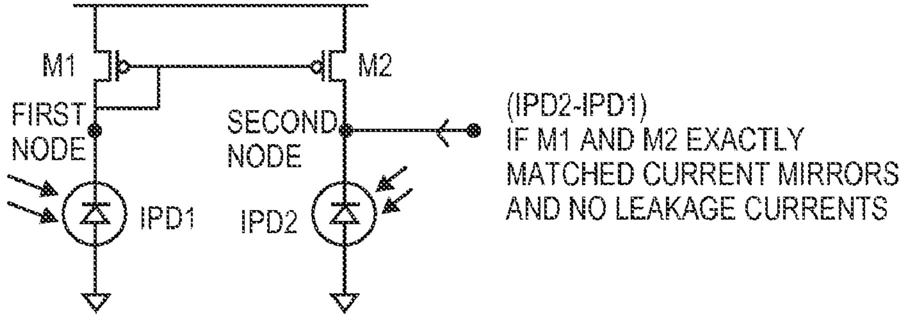
FIG. 1 PRIOR ART
FIG. 1 is a schematic view illustrating a current cancellation circuit in the prior art.

Current cancellation circuits may be employed in microelectronic devices, such as optical sensors, to cancel current at a node. In a specific application, an optical sensor may employ a current cancellation circuit to cancel current at one or more nodes. For example, optical sensors may include current cancellation circuits to cancel leakage current (e.g., dark current) in a device. For instance, leakage current may reduce the resolution of the device. An optical sensor may be unable to detect the entire range of light produced under ambient lighting conditions due to the leakage current (dark current) generated by the photo sensor diodes of the optical sensor. Thus, current cancellation circuits are used to compensate for leakage current in an optical sensor. Leakage current cancellation improves the resolution of the sensor when sensing ambient light conditions.

Accordingly, techniques are described to provide current cancellation in a circuit. In an implementation, a circuit includes a first current source coupled to a first node to provide a first current source current IPD1 and a first current mirror coupled to the first node through a first switch T1 to provide a current mirror reference current IREF1. Switch T1 is configured to have an open configuration and a closed configuration. In the closed configuration, the current mirror reference current IREF1 flows into the first node from the first current mirror. In the open configuration, no current flows from the first current mirror to the first node. A sigma delta modulator is configured to control the switch configuration such that over a period of time the average current flowing from the first current mirror into the first node is equal to the first current source current IPD1 flowing out of the first node. For instance, a sigma delta modulator generates a discrete pulse density modulated output to close switch T2 to allow the second current mirror reference current IREF2 to flow into a second node, thus subtracting a portion of the second current source current IPD2 at the second node. The equivalent current at the second node is defined by the equation (IPD2−[IPD1*(IREF2/IREF1)]). When the first current mirror reference current IREF1 is equal to the second current mirror reference current IREF2, the equivalent current at the second node is the difference of the first current source current IPD1 and the second current source current IPD2 (e.g., if first current source current IPD1 is 1 pA, then approximately 1 pA is cancelled from the second current source current IPD2 at the second node). In an implementation, IREF1 and IREF2 may be matched using dynamic element matching where IREF1 and IREF2 are interchanged every clock cycle. The technique described above may be used for currents in reverse polarity as well. In the following discussion, an example current cancellation circuit is first described. An exemplary process is then described that may be employed to cancel currents in a circuit.

Example Current Cancellation Circuit

Figure 2:
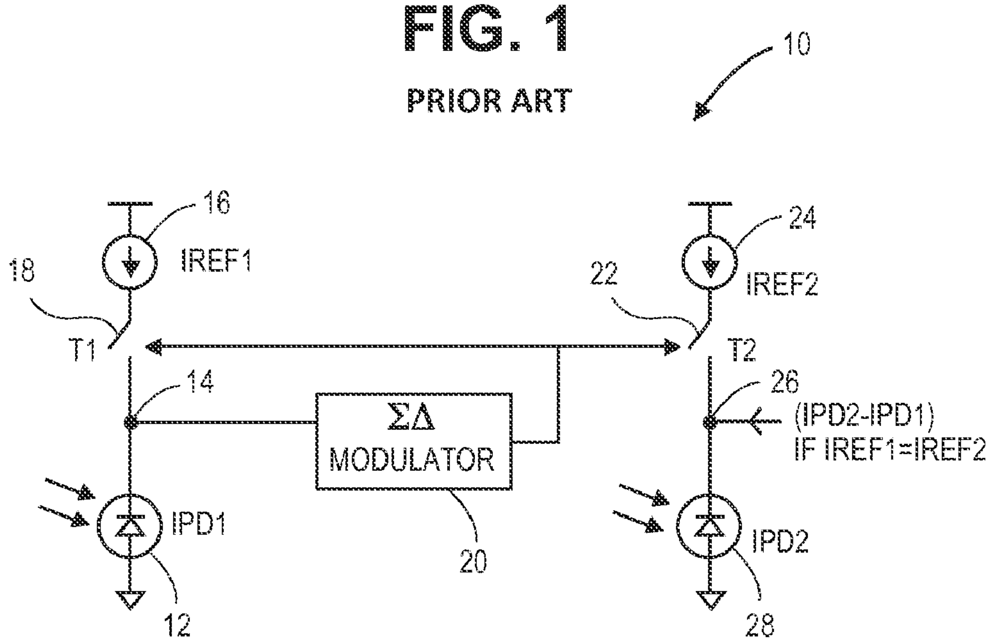
FIG. 2 is a schematic view illustrating a current cancellation circuit in accordance with the present disclosure.

FIG. 2 illustrates a circuit 10 in accordance with an example implementation of the present disclosure. Circuit 10 includes first current source 12 coupled to first node 14 to provide a first current source current IPD1. Circuit 10 also includes first current mirror 16 coupled to first node 14 through switch T1 18 to provide current mirror reference current IREF1 to first node 14. Switch T1 18 is configured to have an open configuration and a closed configuration. In the closed configuration, current mirror reference current IREF1 flows from first current mirror 16 into first node 14. In the open configuration, no current flows from first current mirror 16 (e.g., IREF1) into first node 14.

Circuit 10 further includes sigma delta modulator 20 that is configured to control the switch configuration (e.g., open configuration, closed configuration) such that over a period of time the average current flowing from first current mirror 16 (e.g., reference current IREF1) into first node 14 is equal to first current source current IPD1 flowing out of first node 14. For instance, sigma delta modulator 20 is configured to generate a discrete pulse density modulated output that controls the switch configuration of switch T2 22. When in the closed configuration, switch T2 22 allows second current mirror reference current IREF2 generated by second current mirror 24 to flow into second node 26, which subtracts a portion of second current source current IPD2 (e.g., current IPD2 is generated by second current source 28) at second node 26. The equivalent current at second node 26 is defined (e.g., represented) by the equation (IPD2-[IPD1*(IREF2/IREF1)]). When first current mirror reference current IREF1 is equal to second current mirror reference current IREF2, the equivalent current at second node 26 is the difference of first current source current IPD1 and second current source current IPD2 (e.g., if first current source current IPD1 is 1 pA, then approximately 1 pA is cancelled from second current source current IPD2 at second node 26).

Figure 3:
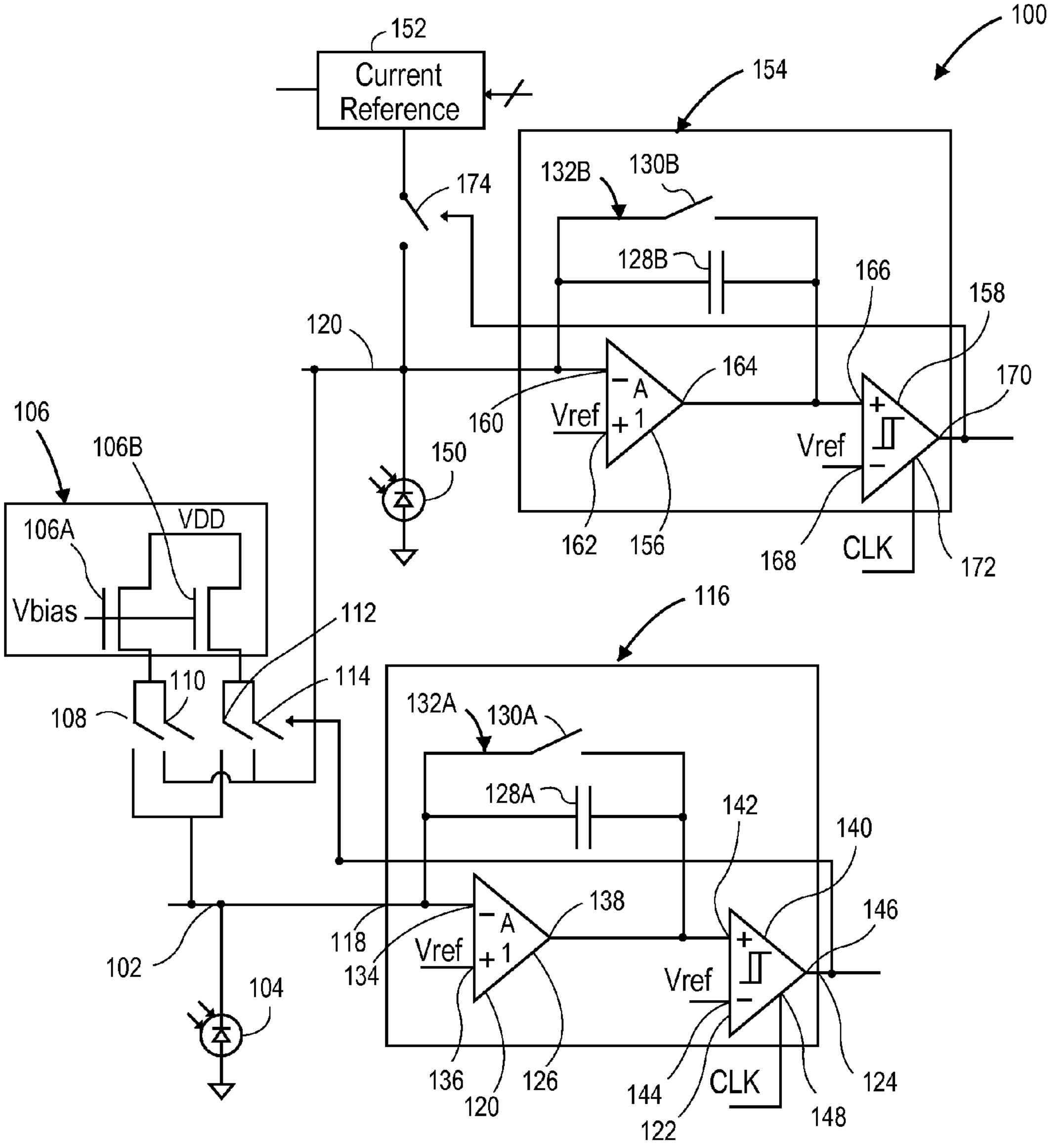
FIG. 3 is a schematic view illustrating another current cancellation circuit in accordance with the present disclosure.
Figure 4:
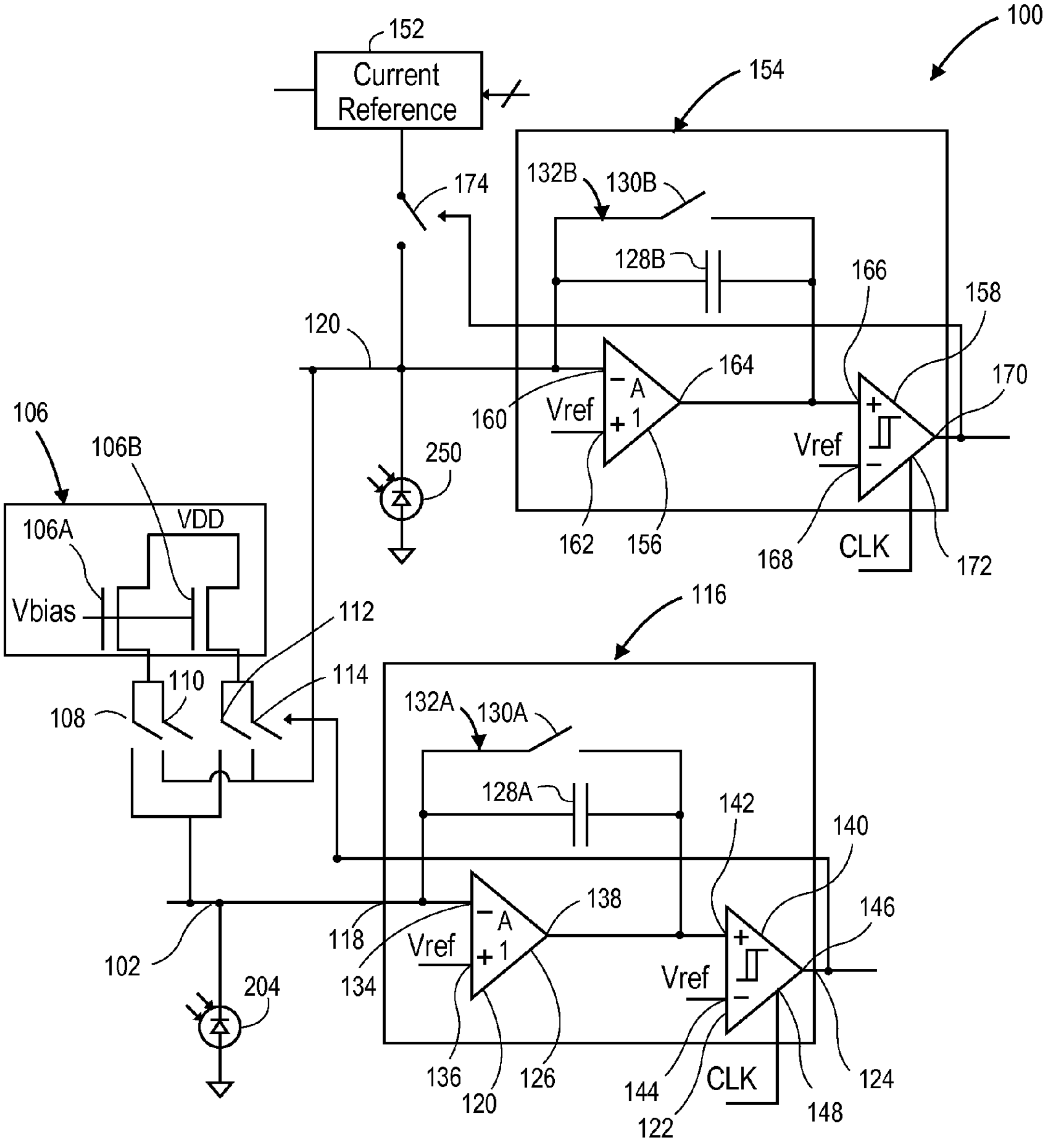
FIG. 4 is a schematic view illustrating an implementation of the current cancellation circuit depicted in FIG. 3.

FIGS. 3 and 4 illustrate a circuit 100 in accordance with example implementations of the present disclosure. As shown, the circuit 100 includes first node 102, first current source 104 coupled to the first node 102, current mirror 106, plurality of switches (four switches 108, 110, 112, 114 are illustrated) coupled to the current mirror 106, and delta sigma modulator 116. The circuit 100 is configured to cancel current 104 at second node 120 over a period of few clock cycles.

First and second nodes 102, 120 provide interconnectivity functionality to the various circuit elements of circuit 100. Nodes 102, 120 may be defined as a point where two or more circuit elements meet. For example, as illustrated in FIG. 3, first current source 104, the plurality of switches 108, 110, 112, 114, and the delta sigma modulator are coupled to first node 102. In an application, first and second nodes 102, 120 may comprise metal interconnections, polycrystalline silicon (polysilicon) interconnections, wire interconnections, and so on.

First current source 104 provides current to first node 102. First current source 104 may be implemented in a variety of ways. For example, first current source 104 may comprise a current source that generates a first current source current. In another example, first current source 104 may comprise dark diode 204 as illustrated in FIG. 4. Dark diode 204 generates a dark current in the low pico Ampere (pA) range. For example, in one implementation, dark diode 204 may generate dark current having a range of one (1) pA to one hundred (100) pA. Dark diode 204 may, for example, comprise a photodiode that is covered by an opaque material. In one implementation, covering of the photodiode may occur when circuit 100 is implemented as a part of another micro-electronic circuit (e.g., optical sensor, etc.). For example, dark diode 204 may be covered by metal, dark plastic material, or the like. It is contemplated that the polarity of current source 104 (204) may be reversed from the illustrated version in FIGS. 3 and 4 along with current mirror 106 without departing from the spirit of this disclosure.

Current mirror 106 may provide current generation functionality to circuit 100. Current mirror 106 may be implemented in a variety of ways. For example, current mirror 106 may include first transistor 106A and second transistor 106B. First and second transistors 106A, 106B may be fabricated utilizing complementary metal-oxide-semiconductor (CMOS) techniques (i.e., a P-type metal-oxide-semiconductor (PMOS) current mirror, a N-type metal-oxide-semiconductor (NMOS) current mirror), bipolar techniques, and so forth. In an implementation, first and second transistors 106A, 106B are held at the same voltage (shown as Vbias in FIGS. 3 and 4) and operate in the saturation region. Thus, current mirror 106 may generate a first current mirror reference current through transistor 106A and may generate a second current mirror reference current through transistor 106B. In an implementation, a resistor tied to a reference voltage may be used to generate the current mirror reference current. The plurality of switches 108, 110, 112, 114 are coupled to current mirror 106. Each switch 108, 110, 112, 114 is configured to switch between an open configuration (i.e., open circuit) to prevent current flow and a closed configuration (i.e., closed circuit) to allow current flow. As shown, first switch 108 is coupled to first transistor 106A and provides the first current mirror reference current generated by transistor 106A to second node 102 via an interconnection (e.g., metal interconnection, polysilicon interconnection, etc.) when first switch 108 is in a closed configuration. Second switch 110 is also coupled to first transistor 106A and provides the first current mirror reference current generated by first transistor 106A to second node 120 when second switch 110 is in a closed configuration. Third switch 112 is coupled to second transistor 106B and provides the second current mirror reference current generated by second transistor 106B to first node 102 when the third switch 112 is in a closed configuration. Fourth switch 114 is also coupled to second transistor 106B and provides the second current mirror reference current generated by second transistor 106B to the second node 120 when fourth switch 114 is in a closed configuration.

Delta sigma modulator 116 provides discrete digital value output functionality. For instance, delta sigma modulator 116 may receive a signal at first node 102 and provide a digital signal (e.g., voltage) based upon the received signal and the average value of the first current mirror reference current generated by transistor 106A and the second current mirror reference current provided by transistor 106B. In an implementation, the signal may be an analog signal generated as a result of the current at the first node (e.g., current generated from the first current source). Delta sigma modulator 116 may be configured in a variety of ways. For example, delta sigma modulator 116 may be configured as a 1-bit first order delta sigma analog-to-digital modulator. As illustrated in FIGS. 3 and 4, delta sigma modulator 116 may include input 118, integrator 120, comparator 122, and output 124.

The integrator 120 furnishes an output signal as a function of the analog signal provided at first node 102. In an implementation, integrator 120 provides a "sawtooth" output signal proportional to analog signal. Integrator 120 may be implemented in a variety of ways. For example, integrator 120 may be comprised of operational amplifier 126, capacitor 128A, and switch 130A. Switch 130A is configured to have an open and closed configuration. Capacitor 128A is configured to store energy when switch 130A is in an open configuration and configured to reset when switch 130A is in the closed configuration (which occurs at the beginning of each modulator 116 conversion cycle). Capacitor 128A and switch 130A may be coupled in parallel to form feedback network 132A (e.g., feedback loop) of operational amplifier 126. Capacitor 128A determines the output swing of integrator 120 and may comprise multiple selectable capacitor values to control the output swing of integrator 120. For example, capacitor 128A may have a selectable value of 0.5 picoFarads (pF), 2.5 pF, 5 pF, or the like. Integrator 120 also includes first input 134 and second input 136. First input 134 is tied to input 118 via an interconnect, or the like. Moreover, input 134 is tied to the negative terminal of integrator 120. Second input 136 may be tied to a voltage reference (as depicted in FIGS. 3 and 4) or to ground. Moreover, integrator 120 includes output 138 for furnishing the output signal of integrator 120.

Comparator 122 furnishes comparison functionality between two signals. Comparator 122 may be implemented in a variety of ways. For instance, comparator 122 may be comprised of an operational amplifier 140. Comparator 122 includes first input 142, second input 144, and output 146. First input 142 is tied to output 138 to receive the signal furnished by integrator 120, and second input 144 may be tied to a voltage reference (as depicted in FIGS. 3 and 4) or ground. The signal received at first input 142 is compared to the signal at second input 144 (e.g., ground, specific voltage, etc.). Comparator 122 generates a discrete high signal (e.g., a high voltage signal, a digital "1", a discrete pulse density modulated output, etc.) when the signal received at first input 142 is higher than the signal received at second input 144. When the signal received at first input 142 is lower than the signal received at second input 144, comparator 122 generates a discrete low signal (e.g., a low voltage signal, a digital "0"). Comparator 122 then furnishes the discrete signal (i.e., high signal, low signal) to output 146, which is tied to output 124 via an interconnect, or the like. Comparator 122 also includes clock input 148 to receive a clock signal. Thus, comparator 122 is configured to change the output signal at output 146 during rising or falling clock edges. For example, the output signal provided to output 146 may change from a digital high to a digital low, depending on the input signals, during a rising clock edge, or vice versa. In another example, the output signal provided to output 146 may change from a digital low to a digital high, depending on the input signals, during a falling clock edge, or vice versa.

Circuit 100 utilizes dynamic element matching to average the current mismatch through transistors 106A, 106B of the current mirror 106. In an implementation, the open/closed configuration of switches 108, 110 and 112, 114 are swapped, on every clock edge when the discrete signal (e.g., density modulated output) provided to output 146 is high, to account for the transistor mismatch of the current mirror 106. Switches 108, 110, 112, 114 are in an open configuration (i.e., open circuit) when the discrete signal provided to output 146 is low. In another example, switch 108 and switch 114 are in a closed configuration (i.e., closed circuit) when the discrete signal provided to output 146 is high during the first clock cycle, while switch 110 and switch 112 are in the open configuration. In yet another example, switch 110 and switch 112 are in a closed configuration when the discrete signal provided to output 146 is high during the second clock cycle, while switch 108 and switch 114 are in the open configuration. The continuous rotating, or "swapping," of switches during later clock cycles substantially eliminates the current mismatch (i.e., mismatch of the first current mirror reference current and the second current mirror reference current) caused by the mismatch of transistors 106_a_, 106_b_. In another implementation, switches 108, 110, 112, 114 can be rotated randomly; however, only two of the switches, either 108,114 or 110,112, can be in closed configuration at any given time when the discrete signal is high.

Circuit 100 further includes second current source 150. Second current source 150 furnishes a second current source current to second node 120. Second current source 150 may be implemented in a variety of ways. For instance, second current source 150 may comprise a photo sensor diode 250 (shown in FIG. 4) that is configured to convert light into current. Once light strikes the photo sensor diode, photocurrent is created and provided to node 120. However, a portion of the second current source current may be comprised of leakage current. For instance, a portion of the second current source current may be dark current, or the like. Moreover, first current source 104 (dark diode 204) and second current source 150 (photo sensor diode 250) may be configured to generate current of approximately the same magnitude. For example, first current source 104 (dark diode 204) and second current source 150 (photo sensor diode 250) may generate current in the pA range (i.e., approximately one (1) pA to approximately one hundred (100) pA). Second current source 150 (250) may also be reversed in polarity without departing from the spirit of this disclosure.

Circuit 100 also includes current reference 152 that is coupled to second node 120. Current reference 152 furnishes second node 120 with a first reference current. Current reference 152 may be implemented as an analog circuit element, or the like, configured to provide current generation functionality.

A second delta sigma modulator 154 is coupled to second node 120. Second delta sigma modulator 154 performs substantially the same function as first delta sigma modulator 116 described above. In an implementation, second delta sigma modulator 154 is comprised of an integrator 156 and a comparator 158. Integrator 156 includes a first input 160, a second input 162, and an output 164. First input 160 is coupled to second node 120, and second input 162 may be tied to ground (as shown in FIGS. 3 and 4) or to a voltage reference. Integrator 156 may also include a feedback network 132B (e.g., a feedback loop) comprised of capacitor 128B in parallel with switch 130B. Capacitor 128B determines the output swing of integrator 156 and may comprise multiple selectable capacitor values to control the output swing of integrator 156. For example, capacitor 128B may have a selectable value of 0.5 pF, 2.5 pF, 5 pF, or the like. Comparator 158 includes first input 166, second input 168, output 170, and clock input 172.

First input 166 is coupled to output 164 of integrator 164, and second input 168 may be tied to ground or a voltage reference (as shown in FIGS. 3 and 4). Output 170, which also serves as output for second delta sigma modulator 154, may cause switch 174 to have an open configuration or a closed configuration. For example, switch 174 will be in a closed configuration when a discrete high signal is provided at output 170, which allows the first reference current generated by current reference 152 to flow to second node 120. Switch 174 will be in an open configuration when a discrete low signal is provided to output 170, and prevent the first reference current to flow to second node 120. Moreover, output 170 may further be coupled to various other circuit elements not shown. For example, output 170 may be coupled to an averaging circuit or the like.

Switches 108, 110, 112, 114 switch from an open configuration to a closed configuration, and vice versa, depending on output 146. For example, depending on the digital signal of output 146 (e.g., discrete pulse density modulated output), switches 108, 114 may be in a closed configuration while switches 110, 112 are in an open configuration. In another example, depending on the digital signal of output 146, switches 108, 110 may be in an open configuration while switches 112, 114 are in an open configuration. Thus, the feedback network of delta sigma modulator controls switches 108, 110, 112, 114 in such a way that the average value of current provided by transistors 106A, 106B into node 102 equals current flowing out of node 102 from current source 104. However, the absolute magnitude of the current provided by transistors 106A, 106B is not equal to current provided by current source 104.

In an implementation, the current provided by current source 104 is digitally represented as a function of the current provided by current mirror 106 via delta sigma modulator 116 (e.g., digitizes the current provided at node 102). As shown in FIGS. 3 and 4, current is dumped into node 120 from current mirror 106 as a function of the digitally represented current provided by current source 104. As a result, the current dumped at node 120 may subtract or add current to the current at node 120. The resulting current (e.g., difference in current after the subtraction or addition of current) is then digitized as a function of the current from current reference 152 (e.g., modulator 154 provides a digital representation of the current from node 120 as a function of the current from current reference 152 at output 170). Moreover, while FIGS. 3 and 4 only depict the current cancellation occurring at second node 120, it is contemplated that the present cancellation technique can be extended to additional nodes. For example, additional current sources can be added to current mirror 106 and additional switches may be coupled to current mirror 106 to provide additional current cancellation.

The following equations can model various approximate values (i.e., current values, number of discrete signals, etc.) present in circuit 100:

$$n1 * \mathrm{Average}(I_{REF(106A)}, I_{REF(106B)}) = N * I_{PD1} \quad \text{(Equation 1)}$$

$$n1 = (N * I_{PD1}) / \mathrm{Average}(I_{REF(106A)}, I_{REF(106B)}) \quad \text{(Equation 2)}$$

$$n2 = N * (I_{PD2} - I_{PD1}) / I_{REF(152)} \quad \text{(Equation 3)}$$

where:

n1 represents the number of clock cycles when the discrete output signal at output 124 of sigma delta modulator 116 is high in a given time interval T, where T is the delta sigma modulator 116 conversion time;

n2 represents the number of clock cycles when the discrete output signal at output 170 of sigma delta modulator 154 is high in a given time interval T, where T is the delta sigma modulator 116 conversion time;

N represents the total number of clock cycles in the time interval T;

$I_{REF(106A)}$ represents the current mirror reference current value of 106A;

$I_{REF(106B)}$ represents the current mirror reference current value of 106B;

$I_{PD1}$ represents the current value through first current source 104 (photo sensor diode 204);

$I_{PD2}$ represents the current value through first current source 150 (250);

$I_{REF(152)}$ represents the reference current value of 152;

Average($I_{REF(160A)}$, $I_{REF(160B)}$) represents the average current value of $I_{REF(106A)}$ and $I_{REF(106B)}$.

Example Current Cancellation Process

Figure 5:
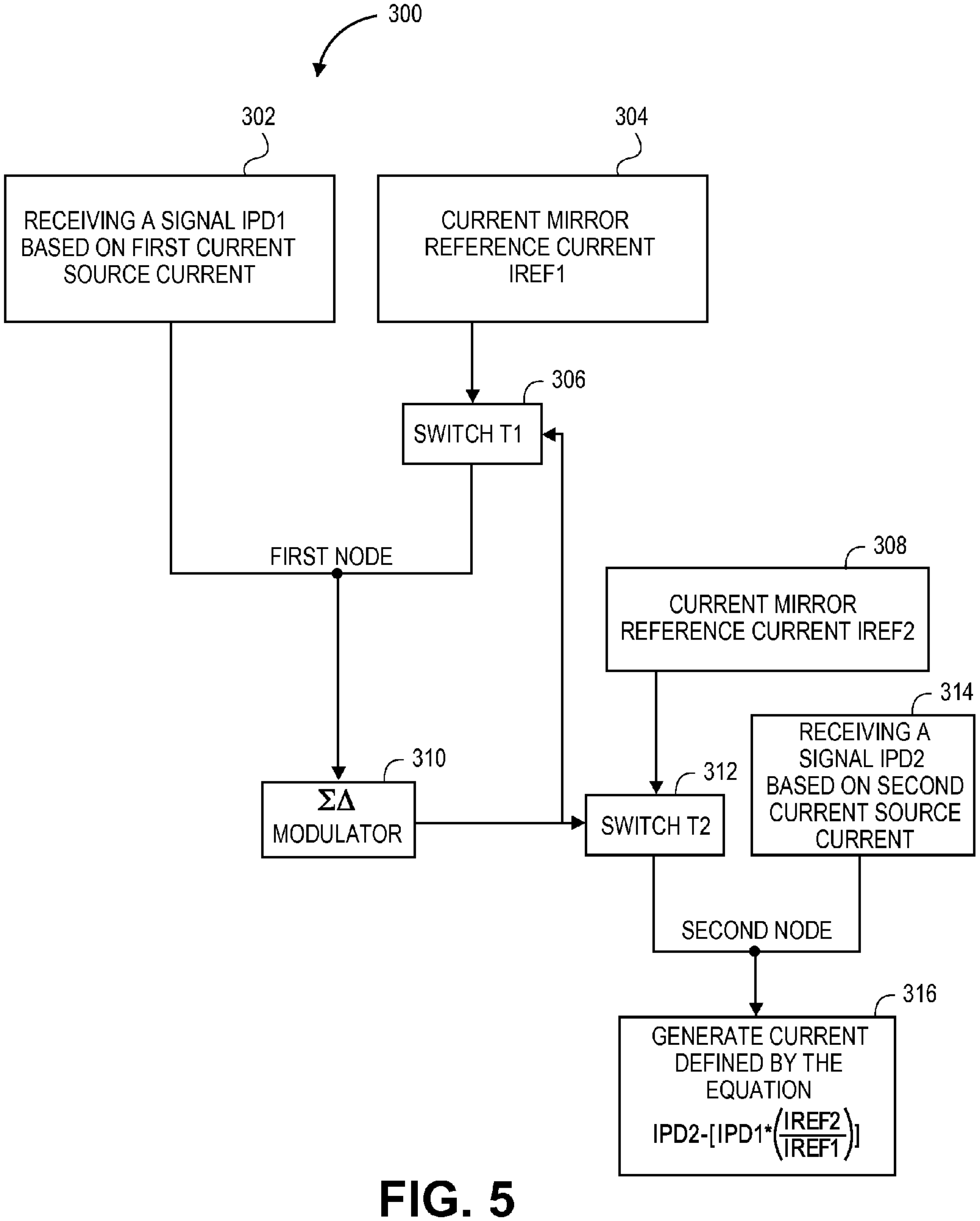
FIG. 5 is a flow diagram illustrating a current cancellation circuit in accordance with the present disclosure.

FIG. 5 illustrates a process 300 for furnishing current cancellation of circuit 100.

As shown, a signal is received at a first node that is based upon a first current source current generated by first current source (Block 302). In an implementation, the signal received at the input may be received by the delta sigma modulator. The signal may be an analog signal at the first node that is a result of the first current source current. As illustrated in FIG. 4, first current source 104 may be dark diode 204, and the first current source current is a dark current. A current mirror reference current IREF1 (Block 304) is also received at the first node through first switch T1 (Block 306).

A second current mirror reference current IREF2 is received at a second node through second switch T2 (Block 308). The first switch T1 can be configured to have an open configuration and a closed configuration. In the closed configuration, switch T1 allows reference current IREF1 to flow into the first node and switch T2 allows reference current IREF2 to flow into the second node. In an open configuration, switches T1 and T2 do not allow any current flow through them.

Reference currents IREF1 and IREF2 can be implemented in a variety of ways. For instance, reference currents IREF1 and IREF2 may be implemented as a first current mirror reference current and a second current mirror reference current. The current mirrors may be implemented in a variety of ways. For example, as shown in FIGS. 3 and 4, current mirror 106 may include first transistor 106A and second transistor 106B. First and second transistors 106A, 106B may be fabricated utilizing complementary metal-oxide-semiconductor (CMOS) techniques (i.e., a P-type metal-oxide-semiconductor (PMOS) current mirror, a N-type metal-oxide-semiconductor (NMOS) current mirror), bipolar techniques, and so forth. In an implementation, first and second transistors 106A, 106B are held at the same voltage (shown as Vbias in FIGS. 3 and 4) and operate in the saturation region. Thus, current mirror 106 may generate a first current mirror reference current (e.g., IREF1) through transistor 106A and may generate a second current mirror reference current (e.g., IREF2) through transistor 106B. In an implementation, a resistor tied to a reference voltage may be used to generate the current mirror reference current.

A sigma delta modulator (Block 310) is configured to control the configuration of switch T1 via a discrete pulse density modulated output such that over a period of time (e.g., clock cycles) the average current flowing from the current mirror reference current IREF1 into the first node is equal to the first current source current IPD1 flowing out of the first node. The discrete pulse density modulated output generated by the sigma delta modulator configures (e.g., closes) switch T2 to allow the second current mirror reference current IREF2 to flow into the second node, thus subtracting at least a portion of the second current source current IPD2 at the second node (Block 314). In an implementation, as shown in FIG. 4, second current source 150 may comprise a photo sensor diode 250 that is configured to convert light into current. An equivalent current at second node is defined (e.g., represented) by the equation IPD2−[IPD1*(IREF2/IREF1)] (Block 316). When IREF1 is equal to IREF2 (e.g., average of the current through transistor 106A and the current through transistor 106B), the equivalent current at second node is defined by the equation (IPD2−IPD1).

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A circuit comprising:

a first node and a second node;

a first current source coupled to the first node, the first current source configured to provide a first current source current;

a second current source coupled to the second node, the second current source configured to provide a second current source current;

a first current mirror coupled to a supply voltage, the first current mirror configured to provide a first current mirror reference current;

a second current mirror coupled to the supply voltage, the second mirror configured to provide a second current mirror reference current;

a first switch coupled to the first current mirror and the first node, the second switch configured to have a switch configuration;

a second switch coupled to the second current mirror and the second node and is configured to have the switch configuration;

a delta sigma modulator having an input and an output, the input coupled to the first node and the output configured to provide a discrete pulse density modulated output to control the switch configuration of the first switch and the second switch, wherein an average value of the discrete pulse density modulated output represents at least the first current source current as a function of the first current mirror reference current and the density modulated output is configured to control the second switch such that an equivalent current at the second node is a difference of the first current source current and the second current source current when the first current mirror current is at least approximately equal to the second current mirror current.

2. The circuit as recited in claim 1, wherein the equivalent current is generated by at least one of the first current mirror or the second current mirror.

3. The circuit as recited in claim 1, wherein the switch configuration comprises at least one of an open configuration or a closed configuration.

4. The circuit as recited in claim 1, wherein the first current mirror and the second current mirror utilize dynamic element matching to provide the first current mirror reference current to the first node during a first clock cycle and the second current mirror reference current to the first node during a second clock cycle.

5. The circuit as recited in claim 1, wherein the first current mirror includes at least a first transistor and a second transistor and the second current mirror includes at least a third transistor and a fourth transistor.

6. The circuit as recited in claim 1, wherein the delta sigma modulator further comprises:

an integrator having an input and an output, the input of integrator coupled to the input of the delta sigma modulator and configured to integrate the first current source current and provide an integrated signal to the output of the integrator; and a comparator having an input and an output, the input of the comparator coupled to the output of the integrator and the output of the comparator coupled to the output of the delta sigma modulator, the comparator configured to compare the integrated signal to a reference signal and generate the discrete pulse density modulated output based upon the comparison.

7. The circuit as recited in claim 1, the first current mirror reference current and the second current mirror reference current comprises a current value ranging from approximately 1 pA to approximately 100 pA.

8. A circuit comprising:

a first node and a second node;

a dark diode coupled to the first node, the dark diode configured to provide a first dark current;

a photo sensor diode coupled to the second node, the photo sensor diode configured to provide a second dark current;

a first current mirror coupled to a supply voltage, the first current mirror configured to provide a first current mirror reference current;

a second current mirror coupled to the supply voltage, the second current mirror configured to provide a second current mirror reference current;

a first switch coupled to the first current mirror and the first node, the first switch configured to have a switch configuration;

a second switch coupled to the second current mirror and the second node, the second switch configured to have the switch configuration;

a sigma delta modulator having an input and an output, the input coupled to the first node and the output configured to provide a discrete pulse density modulated output to control the switch configuration of the first switch and the second switch, wherein an average value of the discrete pulse density modulated output represents at least the first dark current as a function of the first current mirror reference current and the density modulated output is configured to control the second switch such that an equivalent current at the second node is a difference of the first dark current and the second dark current when the first current mirror current is at least approximately equal to the second current mirror current.

9. The circuit as recited in claim 8, wherein the equivalent current is generated by at least one of the first current mirror or the second current mirror.

10. The circuit as recited in claim 8, wherein the switch configuration comprises at least one of an open configuration or a closed configuration.

11. The circuit as recited in claim 8, wherein the first current mirror and the second current mirror utilize dynamic element matching to provide the first current mirror reference current to the first node during a first clock cycle and the second current mirror reference current to the first node during a second clock cycle.

12. The circuit as recited in claim 8, wherein the first current mirror includes at least a first transistor and a second transistor and the second current mirror includes at least a third transistor and a fourth transistor.

13. The circuit as recited in claim 8, wherein the delta sigma modulator further comprises:

an integrator having an input and an output, the input of integrator coupled to the input of the delta sigma modulator and configured to integrate the first dark current and provide an integrated signal to the output of the integrator; and a comparator having an input and an output, the input of the comparator coupled to the output of the integrator and the output of the comparator coupled to the output of the delta sigma modulator, the comparator configured to compare the integrated signal to a reference signal and generate the discrete pulse density modulated output based upon the comparison.

14. The circuit as recited in claim 8, the first current mirror reference current and the second current mirror reference current comprises a current value ranging from approximately 1 pA to approximately 100 pA.

* * * * *